US010768186B2

(12) United States Patent
Takaya et al.

(10) Patent No.: US 10,768,186 B2
(45) Date of Patent: Sep. 8, 2020

(54) INSPECTION DEVICE

(71) Applicant: Hitachi High-Tech Corporation, Minato-ku, Tokyo (JP)

(72) Inventors: Eiji Takaya, Tokyo (JP); Hideo Enoki, Tokyo (JP); Shigeki Yamaguchi, Tokyo (JP); Koichi Obari, Tokyo (JP); Yoshiaki Shishido, Tokyo (JP); Masahito Kakuno, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 246 days.

(21) Appl. No.: 15/555,657

(22) PCT Filed: Feb. 1, 2016

(86) PCT No.: PCT/JP2016/052849
§ 371 (c)(1),
(2) Date: Sep. 5, 2017

(87) PCT Pub. No.: WO2016/147714
PCT Pub. Date: Sep. 22, 2016

(65) Prior Publication Data
US 2018/0052183 A1 Feb. 22, 2018

(30) Foreign Application Priority Data
Mar. 18, 2015 (JP) .................. 2015-054146

(51) Int. Cl.
G01N 35/00 (2006.01)
G01N 35/02 (2006.01)
G01N 35/04 (2006.01)

(52) U.S. Cl.
CPC . G01N 35/00603 (2013.01); G01N 35/00732 (2013.01); G01N 35/02 (2013.01);
(Continued)

(58) Field of Classification Search
CPC ....... G01N 35/00603; G01N 35/00594; G01N 35/02; G01N 35/00732; G01N 35/026; G01N 35/04; G01N 2035/00633
(Continued)

(56) References Cited

U.S. PATENT DOCUMENTS

2012/0174687 A1 7/2012 Ohga et al.

FOREIGN PATENT DOCUMENTS

JP 2011-138835 A 7/2011
JP 2013-257157 A 12/2013
(Continued)

OTHER PUBLICATIONS

International Search Report (PCT/ISA/210) issued in PCT Application No. PCT/JP2016/052849 dated Apr. 26, 2016 with English translation (Two (2) pages).
(Continued)

Primary Examiner — Robert R Raevis
(74) Attorney, Agent, or Firm — Crowell & Moring LLP

(57) ABSTRACT

In medical analysis devices and automatic specimen examination systems, the specimen conveyance mechanism is constituted by a plurality of belt lines. During installation or maintenance of the specimen conveyance mechanism, it is necessary to confirm the existence of steps at the joints of these belt lines and the parallelism of the conveyance line. According to the present invention, it is possible to lighten the burden of this work with a test tube type or conveyance holder type inspection device provided with a sensor and battery for operation. Also, even when an operator cannot visually confirm the conveyance line from outside, it is possible to confirm the state of the conveyance line.

11 Claims, 16 Drawing Sheets

(52) U.S. Cl.
CPC .......... *G01N 35/026* (2013.01); *G01N 35/04*
(2013.01); *G01N 2035/00633* (2013.01)

(58) Field of Classification Search
USPC .... 73/864.81, 865.8, 865.9, 865.6, 489–495;
374/141–143, 153, 154; 381/122, 124;
348/61, 82, 125, 142; 396/419, 427, 661
See application file for complete search history.

(56) References Cited

FOREIGN PATENT DOCUMENTS

| WO | WO 2011/040203 A1 | 4/2011 |
| WO | WO 2014/059134 A1 | 4/2014 |

OTHER PUBLICATIONS

Japanese-language Written Opinion (PCT/ISA/237) issued in PCT Application No. PCT/JP2016/052849 dated Apr. 26, 2016 (Three (3) pages).

Extended European Search Report issued in counterpart European Application No. 16764545.6 dated Oct. 25, 2018 (six (6) pages).

[Fig. 1]
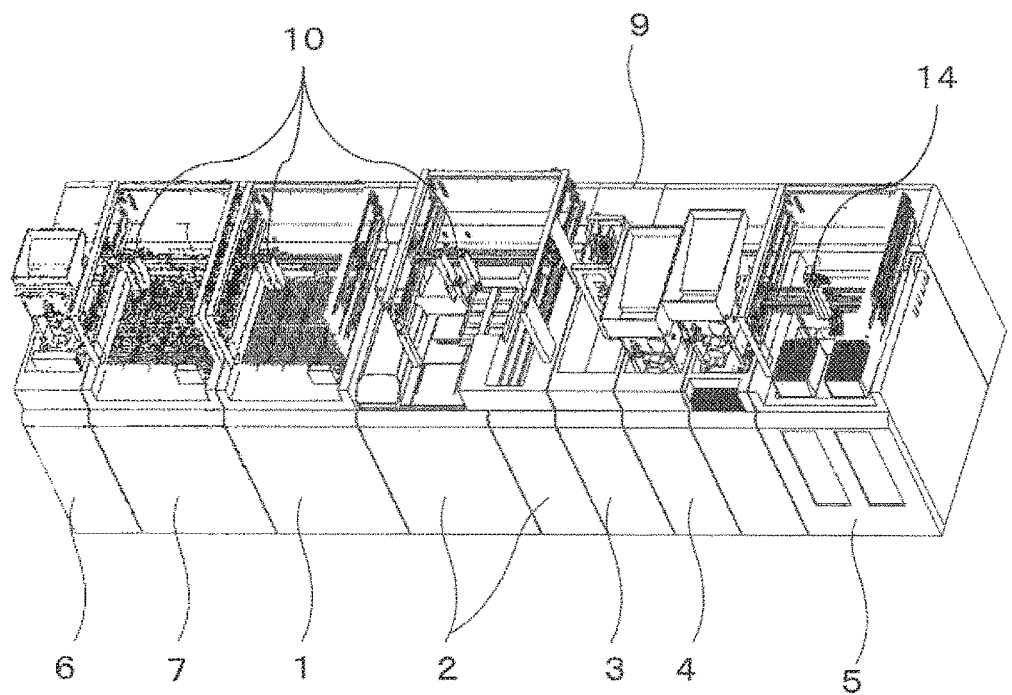

[Fig. 3]
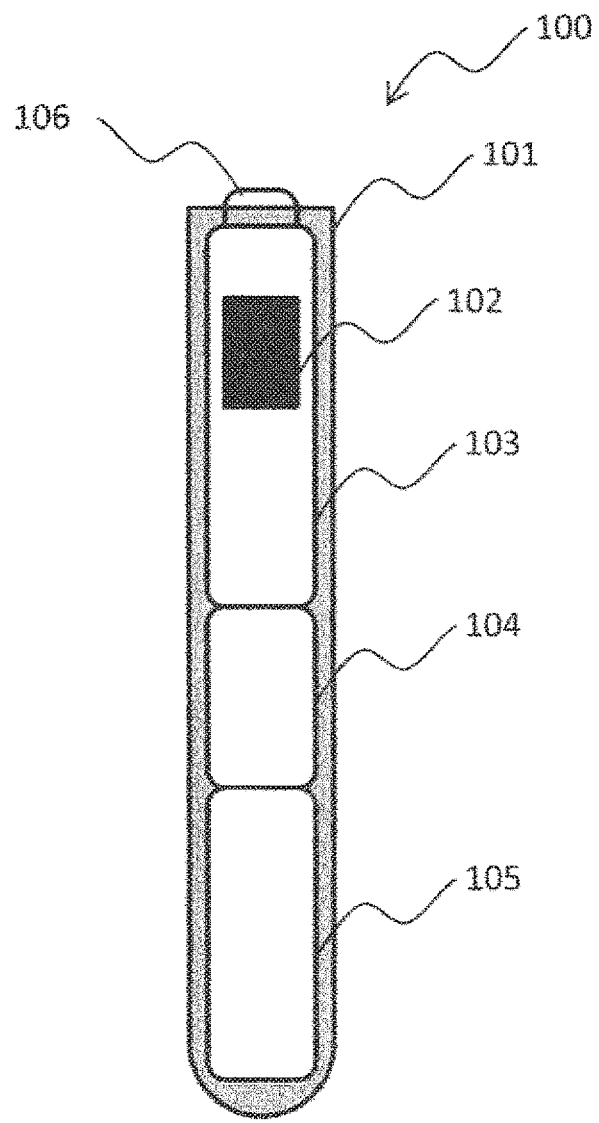

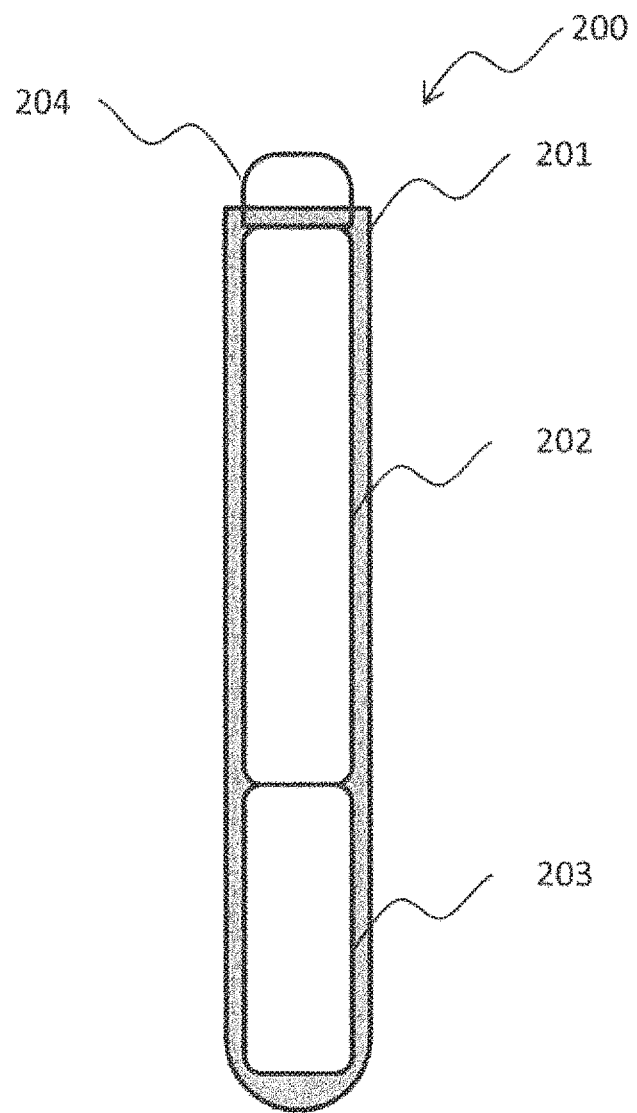
[Fig. 4]

[Fig. 5]
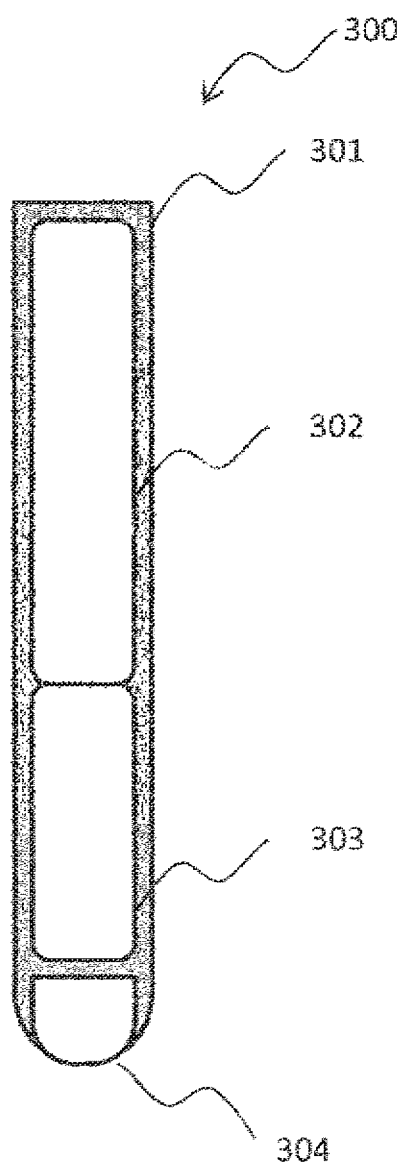

[Fig. 6]
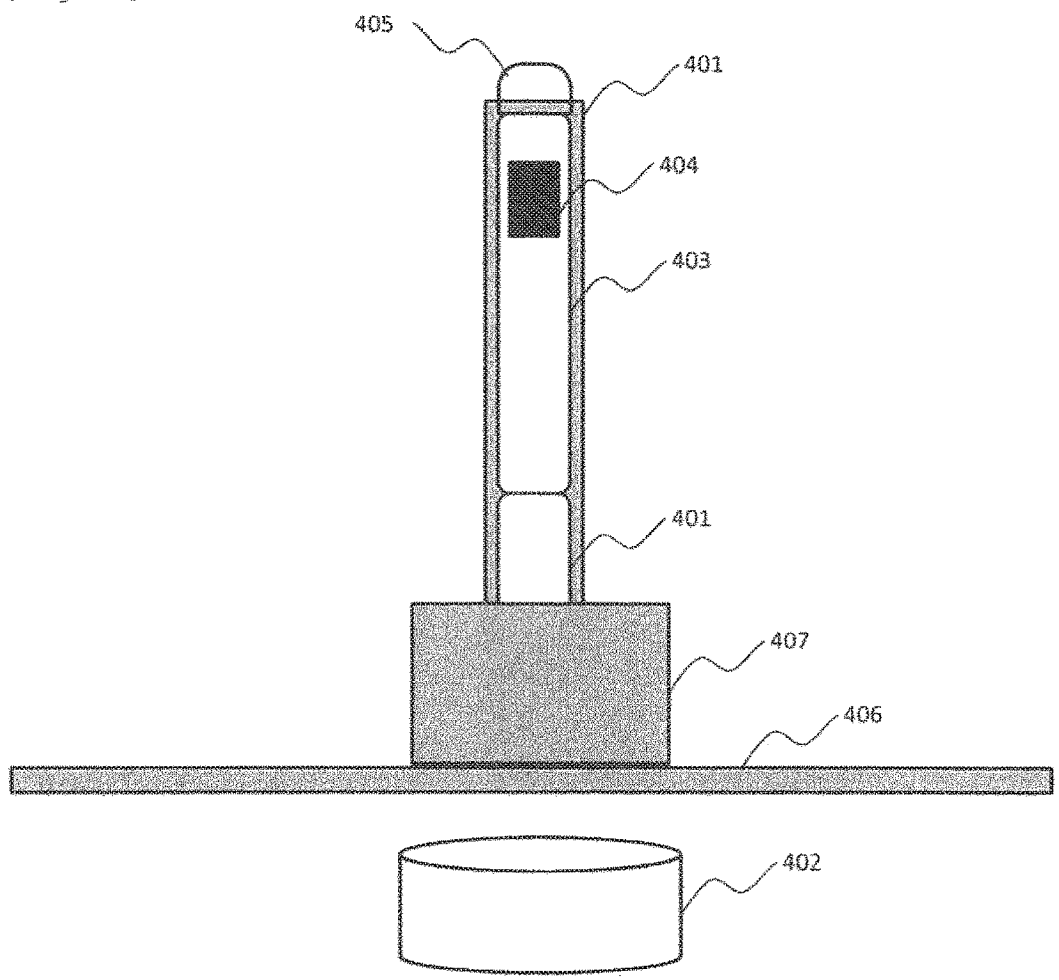

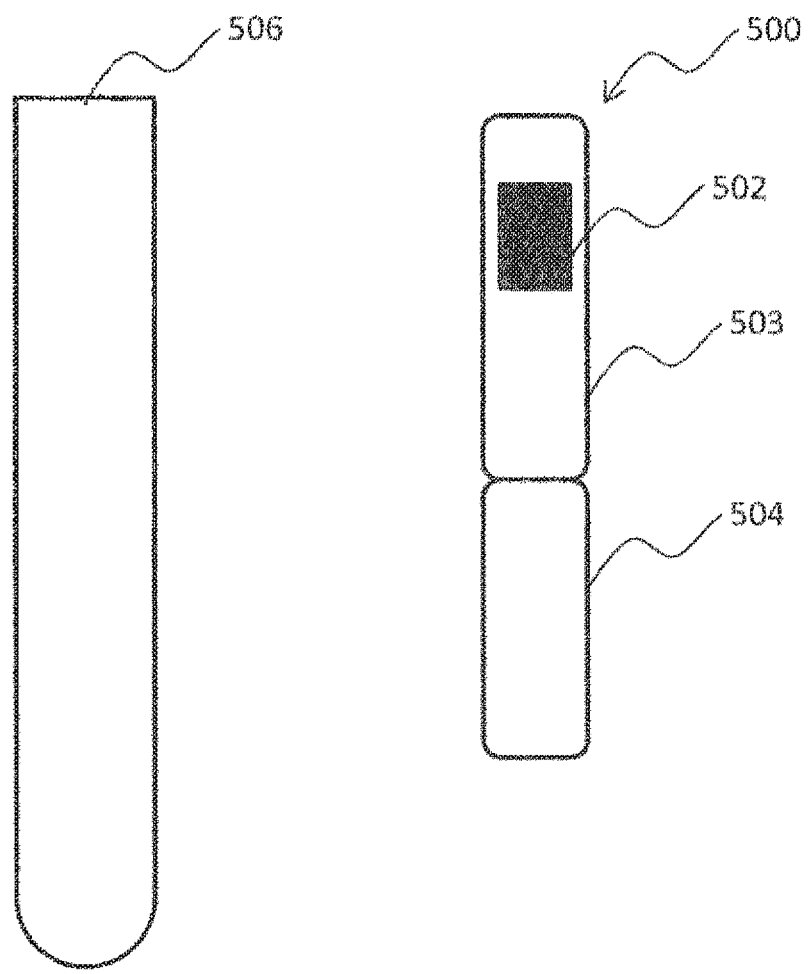
[Fig. 7]

[Fig. 8]
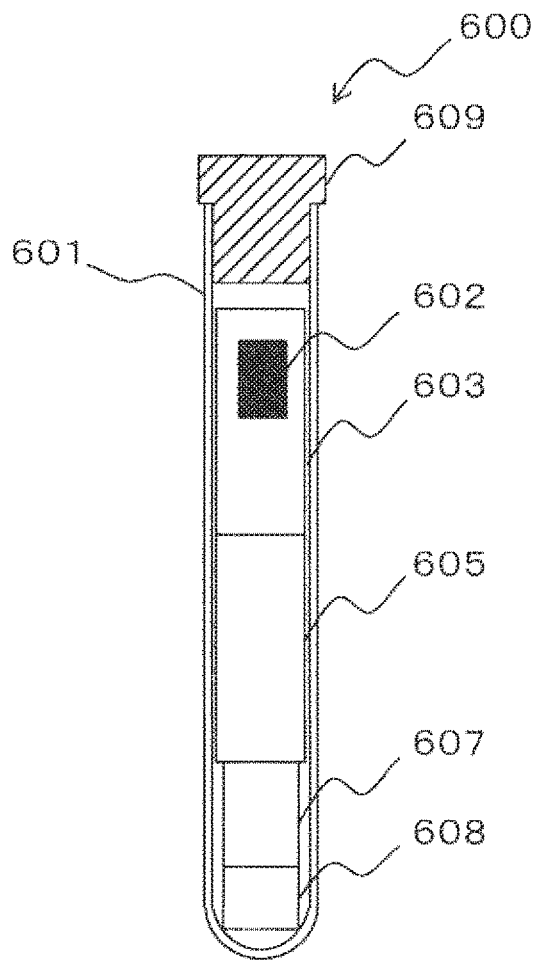
[Fig. 9]
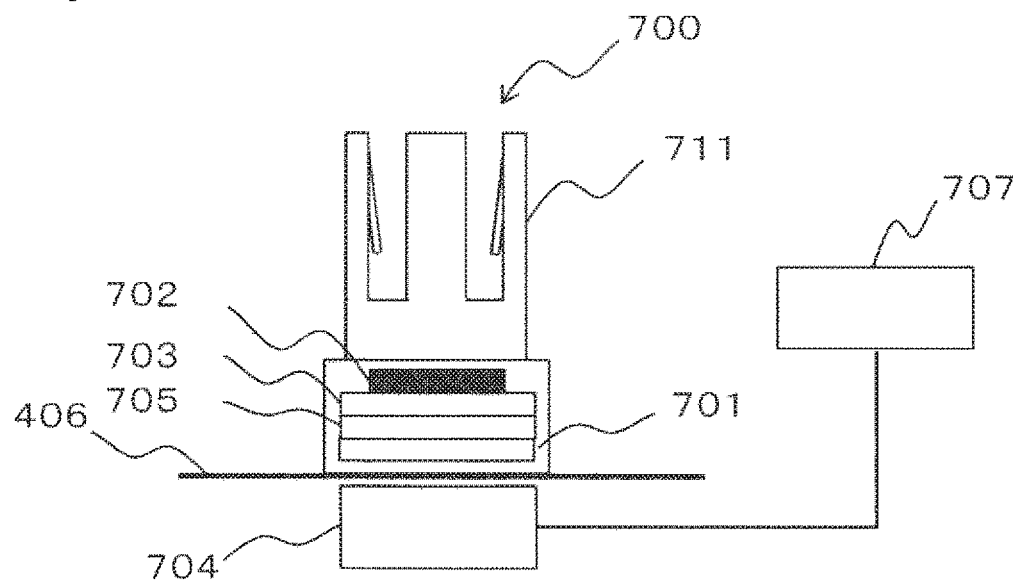

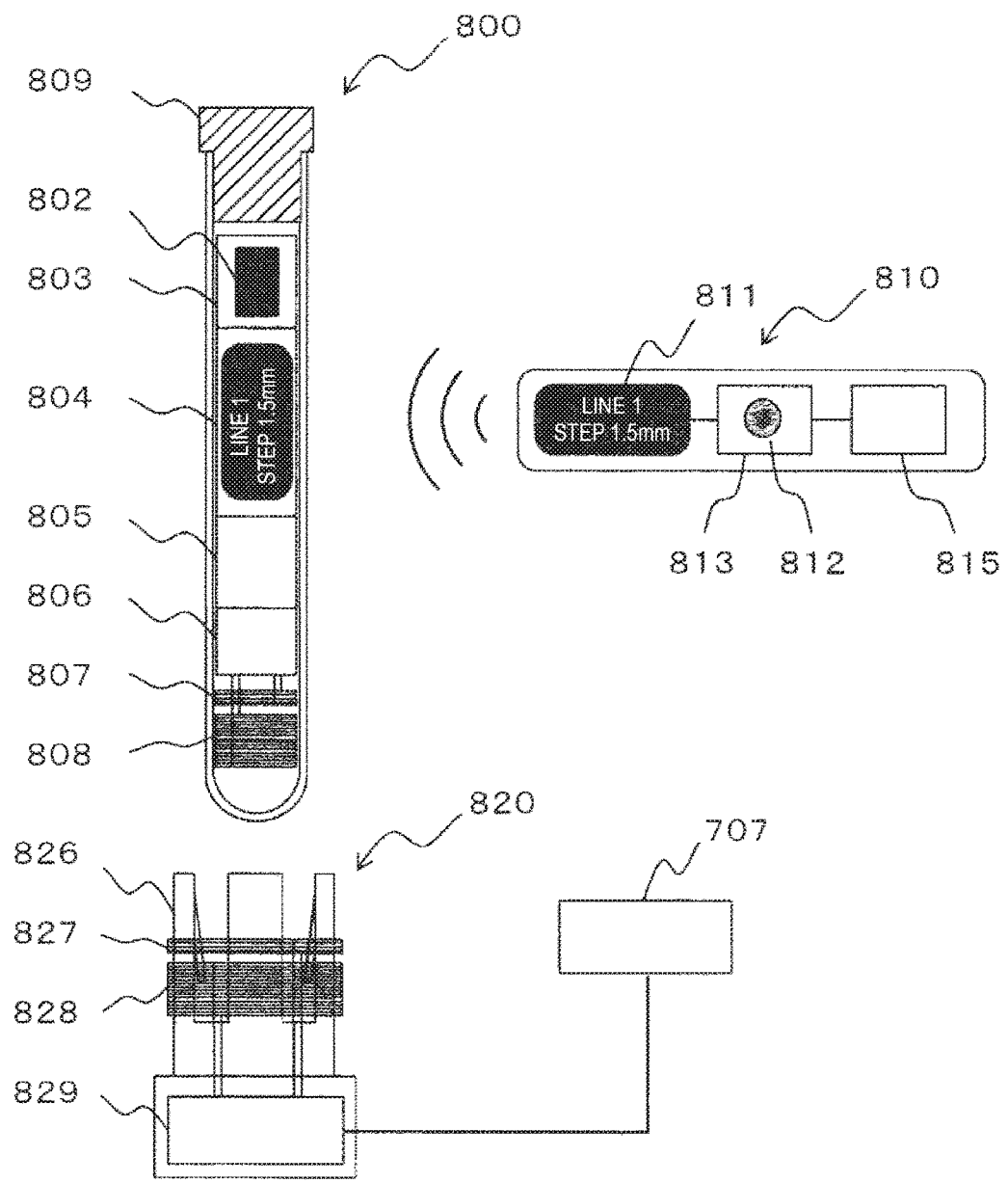
[Fig. 10]

FIG. 11A  FIG. 11B  FIG. 11C
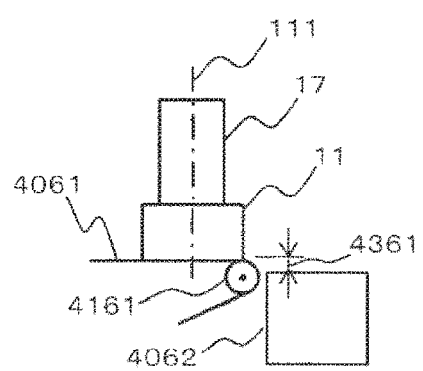
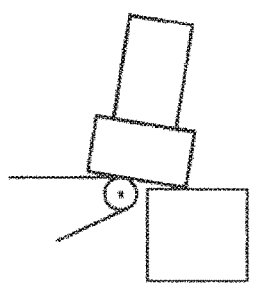
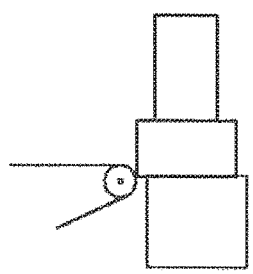
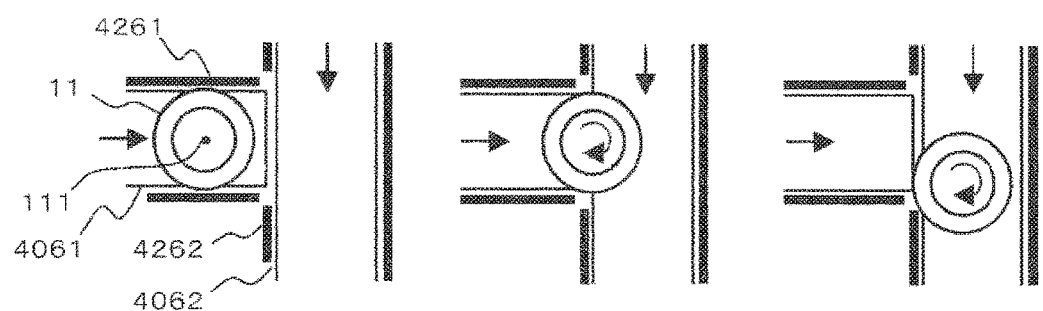
FIG. 11D  FIG. 11E  FIG. 11F

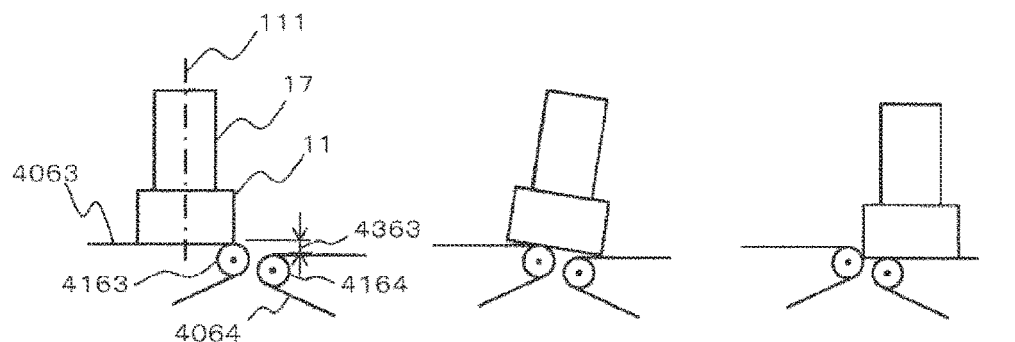
FIG. 12A  FIG. 12B  FIG. 12C
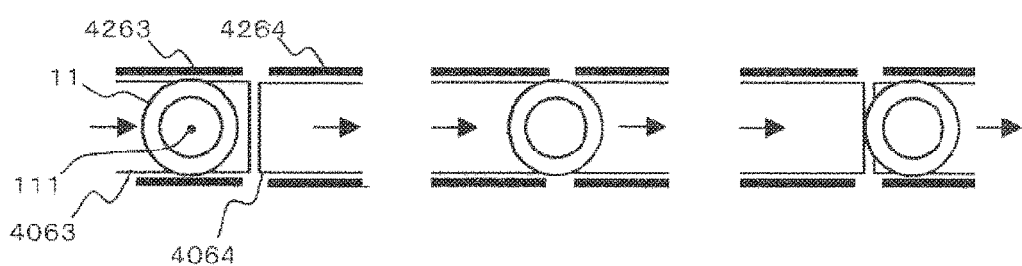
FIG. 12D  FIG. 12E  FIG. 12F
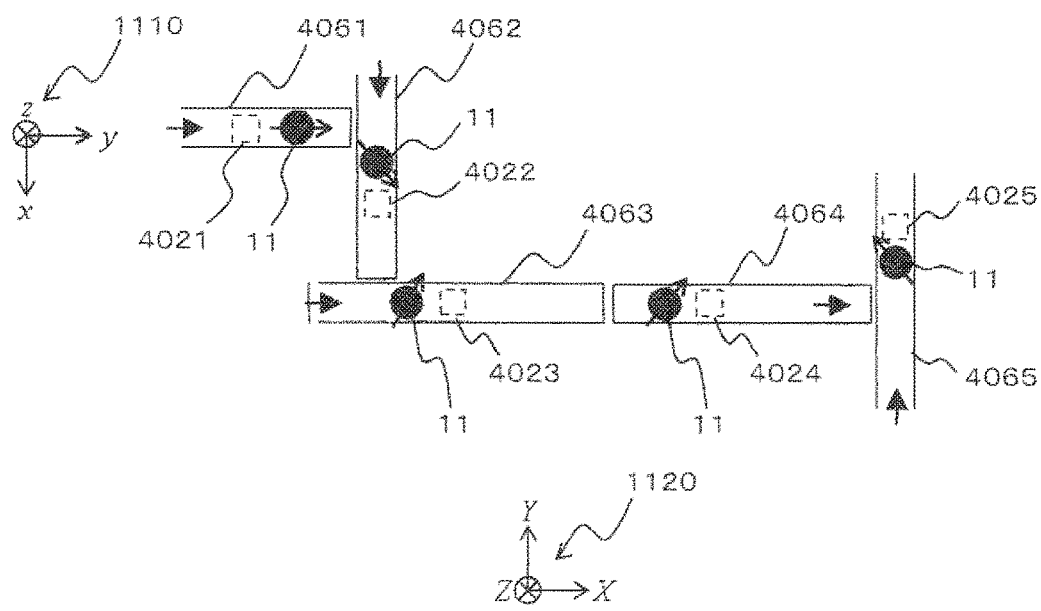
[Fig. 13]

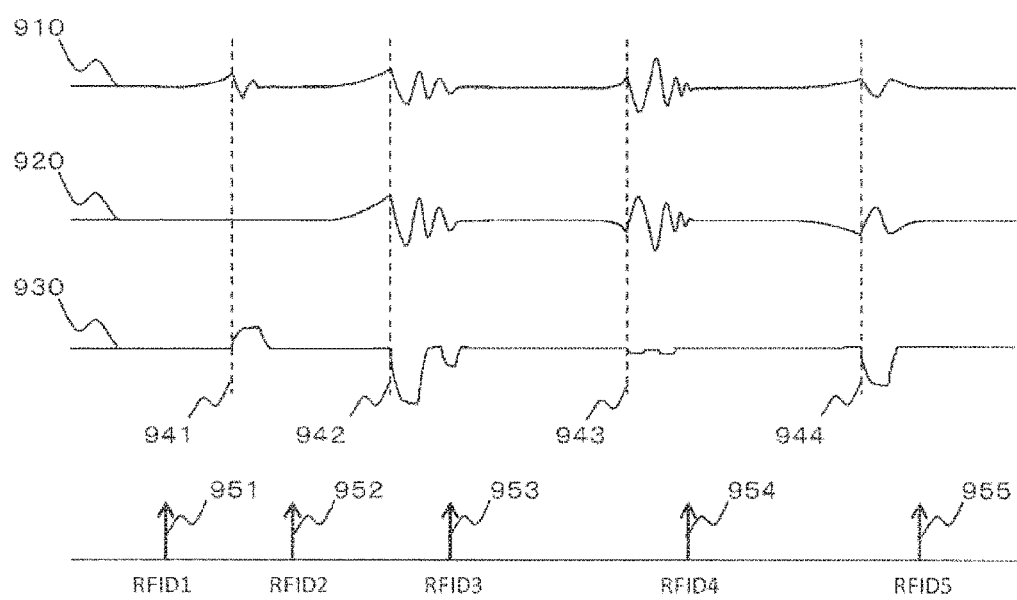
[Fig. 14]

[Fig. 16]
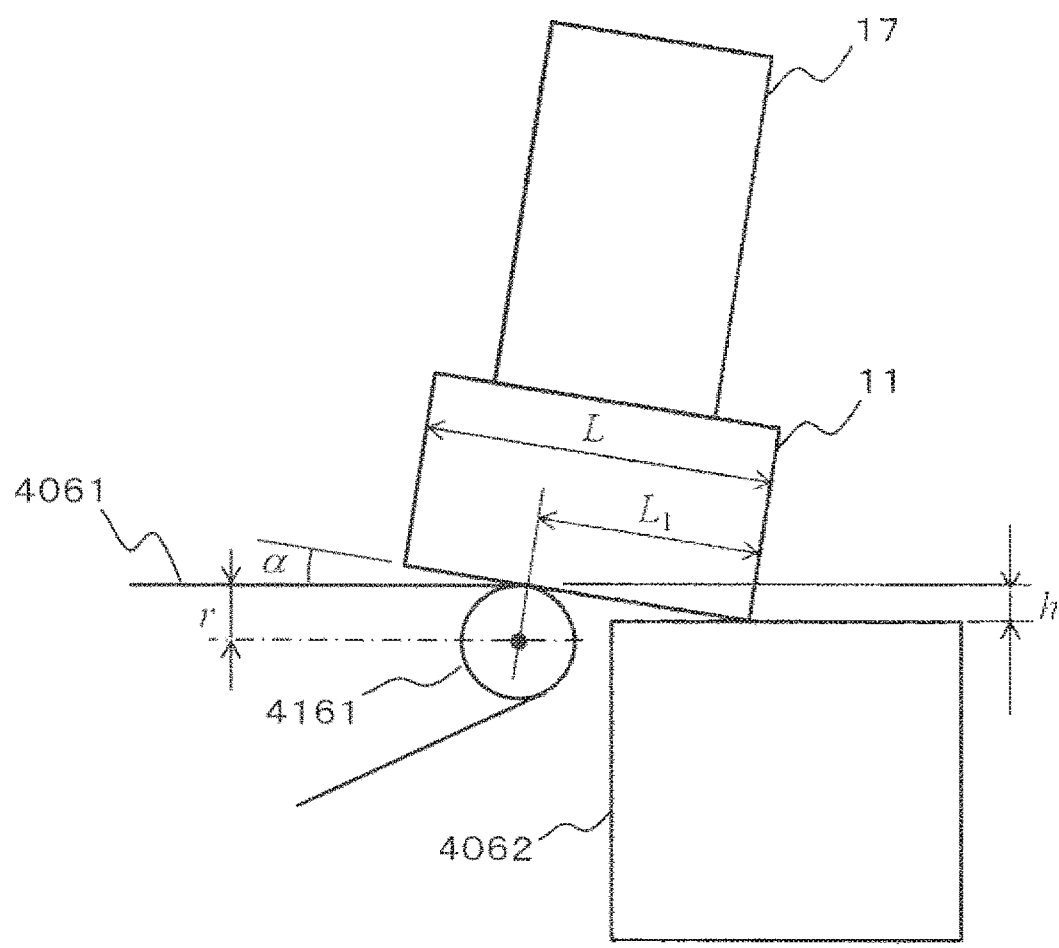

[Fig. 17]
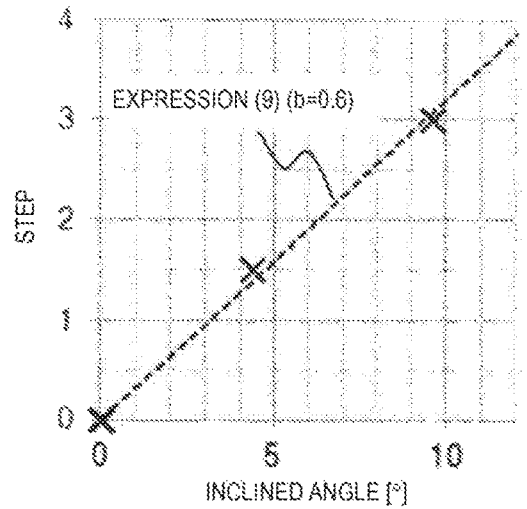
[Fig. 18]
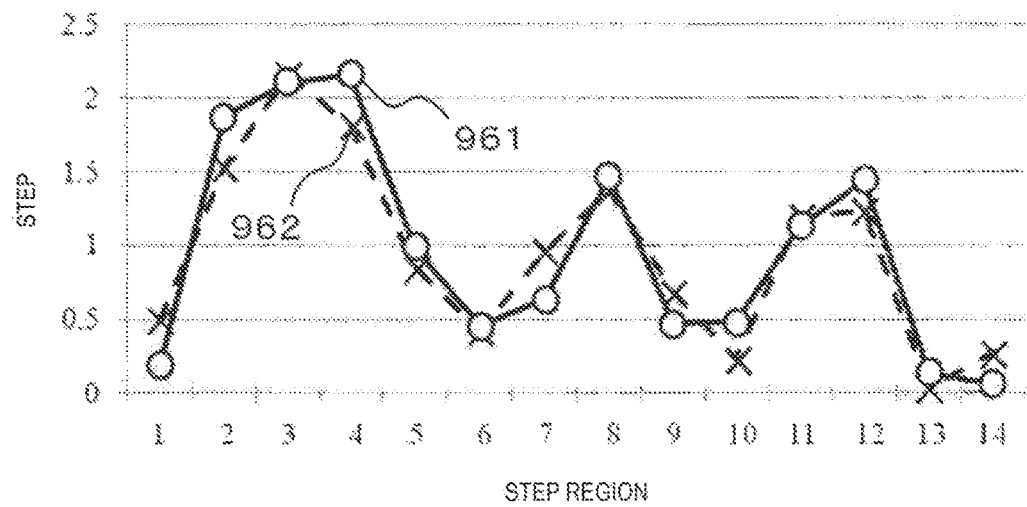

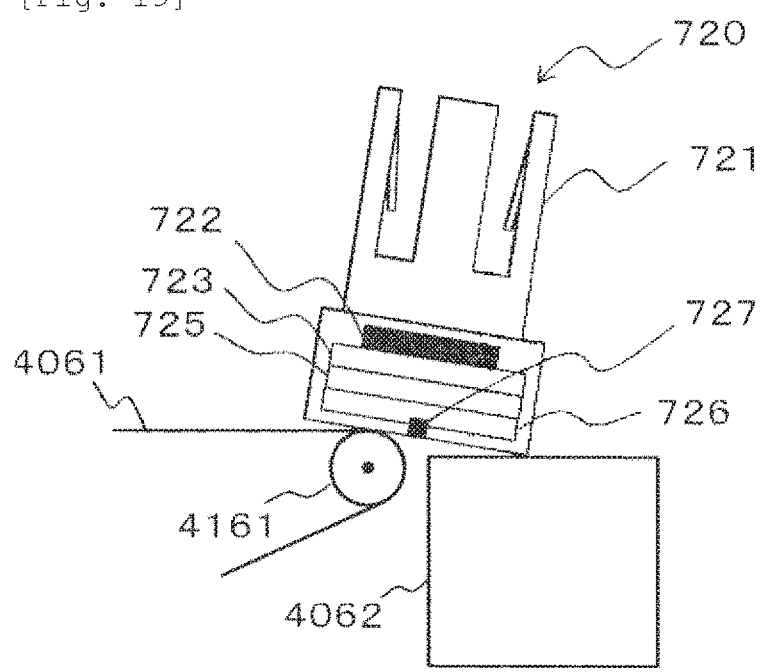
[Fig. 19]

INSPECTION DEVICE

TECHNICAL FIELD

The present invention relates to an inspection device that inspects a test tube conveyance system.

BACKGROUND ART

In medical analysis devices and automatic specimen examination systems, blood, cerebrospinal fluid, or urine which is an examination target is collected in a dedicated test tube and is input into a medical analysis device or a specimen pretreatment system in which pretreatment, which is necessary before analysis is performed, is performed (hereinafter, collectively referred to as a test tube conveyance system), and necessary analysis or pretreatment is performed. The test tube is held by a specimen chuck mechanism, is placed on a specimen rack that is capable of collectively mounting a single, five, or ten dedicated test tubes in the analysis device or the automatic specimen examination system, and is conveyed in the device by a belt line, a hook transmitting mechanism, or the like.

PTL 1 discloses an example of such a test tube conveyance system.

CITATION LIST

Patent Literature

PTL 1: International Publication No. 2011/40203 (Specification in US Patent Unexamined Application Publication No. 2012/0174687A1)

SUMMARY OF INVENTION

Technical Problem

In the test tube conveyance system disclosed in PTL 1, a conveyance line that conveys a specimen rack through a long distance is configured by linking a plurality of belt line mechanisms. In the related art, during installation or maintenance of a conveyance mechanism of such a system, it is necessary to confirm the existence of steps at the joints of these belt lines or the parallelism of the conveyance line visually or by a level or the like, to perform running by conveying multiple specimen racks, and to confirm non-occurrence of abnormality, and thus time and effort are expended. Therefore, it is difficult to perform the maintenance of the mechanism as a routine. In general, after an operator recognizes the occurrence of abnormality, the maintenance is performed to improve a state of the device.

Further, in recent years, as disclosed in PTL 2, conveyance lines are disposed over a plurality of stories and a specimen rack is conveyed to a lower story that cannot be seen by an operator from the outside in some cases, or the specimen rack is conveyed through a deep position in a device. In such cases, a problem arises in that it is not possible to visually confirm the state if an exterior cover is not removed.

Solution to Problem

Configurations of the present application for solving the problem are as follows. In other words, there is provided an inspection device including: a housing having an external shape that can be detachably held by a conveyance body that is capable of holding and conveying a test tube; a sensor that is provided in the housing and detects a state in a device during the conveyance; a storage unit that stores output data from the sensor; and a transmission unit that transmits data in the storage unit to the outside.

Also, as another example, there is provided an inspection device of the present invention including: a conveyance body that is capable of holding a test tube and conveying the test tube over a conveyance belt; a sensor that is provided in the conveyance body and detects a state in a device during the conveyance; a storage unit that stores output data from the sensor; and a transmission unit that transmits data in the storage unit to the outside.

Advantageous Effects of Invention

It is possible to perform installation, adjustment, or inspection work of a test tube conveyance device in a highly effective manner.

BRIEF DESCRIPTION OF DRAWINGS

FIG. 1 is a view illustrating an outline of a specimen conveyance system.

FIG. 3 is a schematic view of a test tube type inspection device (type 1).

FIG. 4 is a schematic view of a test tube type inspection device (type 2).

FIG. 5 is a schematic view of a test tube type inspection device (type 3).

FIG. 6 is a schematic view of the system in a case of using an electronic tag.

FIG. 7 is a schematic view of an inspection device 500 (type 4).

FIG. 8 is a schematic view of an inspection device for measuring shakiness of the test tube.

FIG. 9 is a schematic view of a rack type inspection device.

FIG. 10 is a schematic view of an inspection device corresponding to automatic charge/display/remote control.

FIGS. 11A through 11F are views illustrating a moving state of a rack in a case where a forward direction between belt lines is changed.

FIGS. 12A through 12F are view illustrating a moving state of the rack in a case where the forward directions between the belt lines are coincident to each other.

FIG. 13 is a view illustrating a moving state of the rack that moves forward over a plurality of belt lines.

FIG. 14 is a diagram illustrating the entirety of changes in angular velocity during the movement over the plurality of belt lines.

FIG. 16 is a diagram illustrating a geometric relationship between an inclination and a step of the rack in the connection portion between belts.

FIG. 17 is a diagram illustrating a relationship between an inclination angle and the step of the rack in the connection portion between belts.

FIG. 18 is a diagram illustrating a step calculated from data obtained from the inspection device that passes through an automatic specimen examination system.

FIG. 19 is a schematic view of a rack type inspection device including a distance sensor on a bottom.

DESCRIPTION OF EMBODIMENTS

Figure 2A:
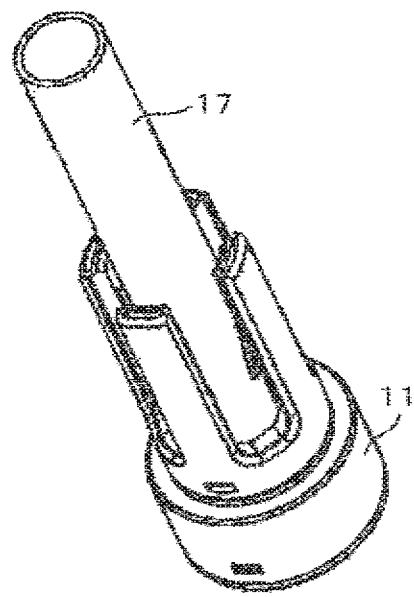
FIGS. 2A and 2B are views illustrating an example of a test tube holder that is used in a test tube conveyance system.

An overview of the present invention is described with reference to the following figures.

FIG. 1 is a view illustrating a specimen conveyance system which is an inspection target according to the present invention. In the specimen conveyance system, a belt conveyor 9 is disposed to extend in a conveying direction, and a unit that performs processing or analysis on a test tube or a specimen is disposed in the conveying direction of the belt conveyor. In a case in FIG. 1, there are provided an input module 1 that inputs a specimen container into a device, a centrifugal module 2 that performs a centrifugal process on the specimen, an opening module 3 that opens a cover which seals an opening, a child specimen preparing module 4 that prepares a child specimen container for dispersing, a dispersing module 5 that performs a child dispersing process of the child specimen container from the test tube, a closing module 6 that closes the cover of the opening of the specimen on which the processes are completed, and an accommodation module 7 that transfers the test tube from a holder and accommodates the test tube in a tray.

Also, during the processes in the modules, a process in which the test tube is conveyed to a predetermined module in a state of being mounted on the belt conveyor 9, a process in which the test tube is held and transferred to another place, a process in which the cover provided on the opening of the test tube is opened, a process in which a predetermined amount of specimen is suctioned through the opening, a process of closing the cover of the opening, or the like is performed. Note that the details of the processes are examples, and another process may be performed on the test tube.

The test tube and the child specimen container are conveyed over a belt line in a state of being mounted on a dedicated rack or holder. Note that the belt conveyor 9 according to the present invention has a configuration of a common belt conveyor. An endless belt is caused to rotate and to be transported by rollers in one direction, thereby, making it possible to convey an object disposed on the belt in one direction. According to the specimen conveyance system, a belt conveyor mechanism having a specified length is prepared, and a plurality of belt conveyor mechanisms are linked in a case where it is necessary to perform long distance conveyance.

Also, in the input module 1, the centrifugal module 2, and the accommodation module 7, a specimen chuck mechanism*that chucks and grasps the test tube from above and transports the test tube to another place is provided. Also, in the dispersing module 5, a dispersing probe mechanism*that suctions the specimen from the opening of the test tube is provided.

Note that FIG. 1 illustrates an example of a system in which a module for specimen pretreatment is disposed; however, a configuration in which an analysis module for analysis is disposed on the downstream side of the specimen pretreatment system may be employed, or a system in which only a plurality of analysis modules are disposed along the belt conveyor may be employed.

Figure 2B:
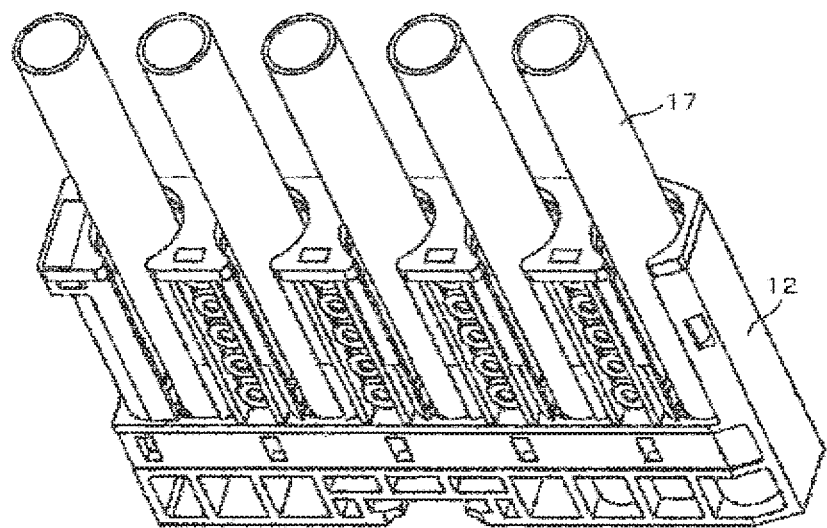

FIG. 2 is a view illustrating an example of a conveyance body that holds and conveys the test tube, which is used in a test tube conveyance system illustrated in FIG. 1. FIG. 2(a) is a single-holder rack 11 that holds and conveys a test tube 17 one by one, and FIG. 2(b) is a multi-holder rack 12 that holds and conveys a plurality of test tubes 17.

Example 1

<Acceleration Sensor, Inclination Sensor, Microphone, Illuminance Sensor, Temperature Sensor>

FIG. 3 schematically illustrates a test tube type inspection device 100 (type 1). In FIG. 1, Reference sign 101 represents a housing of the device, and the housing has the substantially same shape with the size of a common test tube (an outer diameter of 16 mm and a length of 100 mm). Reference sign 102 represents a sensor for acceleration, an angle, a temperature, illuminance, sound, or the like. Reference sign 103 represents a control unit that stores and determines measurement data and transmits data in a wired or wireless manner. Reference sign 104 represents a mechanical stopper mechanism that forcibly stops the specimen conveyance. Reference sign 105 represents a power supply unit and can be charged from the outside through a wire. Reference sign 106 represents warning light at the time of the occurrence of abnormality. The sensor 102 is anyone of sensors of acceleration, an angle, a temperature, illuminance or a microphone for recording sound or a sensor having a combination thereof according to inspection items. As a measurement target, inspection of rattling of the line that performs the specimen conveyance, which is detected by the acceleration or angle sensor, inspection of wear conditions of the belt, inspection of a temperature environment in a course of the specimen conveyance by measuring a temperature inside the device during the conveyance, inspection of a malfunctioning location due to mechanical noise of the line that performs the conveyance, by recording sound during the conveyance, inspection of the illuminance inside a conveyance line portion that is a cause of the occurrence of abnormality in various types of optical sensors, and inspection of an obstacle or a falling object on the malfunctioning location or the line by mounting a wide-angle camera on an upper end or a side surface and observing the inside of the conveyance line can be performed. Further, in a case where the camera is mounted on the upper end or a lower end, the camera can be used as a support tool at the time of teaching of a mounting position of the specimen.

An external shape of the test tube type inspection device is substantially the same as the shape of a common test tube (a diameter of 16 mm and a length of 100 mm). There is no need to have the entirely same shape; however, it is necessary to have a shape that can engage with at least the single-holder rack 11 or the multi-holder rack 12 which is used for conveyance of the common test tube, or the chuck mechanism.

The test tube type inspection device is mounted in the rack, on which the common test tube is mounted, and is conveyed over the belt line. The sensor 102 detects acceleration applied to the test tube during the conveyance, an angle (inclination) of the test tube during the conveyance, an ambient temperature or brightness, or ambient sound.

The control unit 103 acquires an output from the sensor 102 and determines whether or not a sensing result is abnormal by comparing that to a preset threshold value. A stopper of the stopper mechanism 104 is released in response to the determination result of the control unit 103. In this manner, a protruding object comes out to the outer circumference by a spring from the inspection device, and the protruding object comes into press contact with a side wall (guide) or the like of the conveyance line. In this manner, the conveyance operation is forcibly stopped, and an operator is notified of a position of the occurrence of abnormality. After the position of the occurrence of abnormality and the details of the abnormality are confirmed, the stopper manually returns to an appropriate position, and thereby it is possible to have the original diameter.

Note that the condition (threshold value), by which the control unit 103 determines the abnormality, can be changed by an external terminal that is connected thereto. In addition, under control by the external terminal, it is also possible to perform a setting operation such as initialization of various types of sensors, removal of measurement data, or an observation cycle of the measurement data.

The data acquired by the sensor 102 is transmitted to the external terminal via data communication in the wired or wireless manner. The wired data communication is performed by collecting, by the operator, the inspection device in which the inspection work is ended and which is accommodated in the accommodation unit, connecting to a personal computer or the like via a cable, and transmitting the data. In a case of the wireless data communication, the measurement data is transmitted to the personal computer or the like at the real time during the inspection work, and the operator can refer to the data. The power supply unit 105 uses a rechargeable battery and the wired charge is performed.

A state in the device during the conveyance is measured as parameters such as acceleration, speed, and vibration an inclination, illuminance, a volume, or the like during the conveyance, by the sensor 102, and is converted into values.

In a case where an acceleration sensor is provided as the sensor 102, it is possible to measure vibration or a speed during the conveyance. Since the acceleration or the speed is abruptly changed at a position at which the belt of the belt line is worn, it is possible to confirm a belt wear state by acquiring speed information during the conveyance. Therefore, the inspection device in the example is regularly conveyed in the specimen conveyance system, and thereby it is possible to check a wear state of the belt line. Hence, it is possible to immediately cope with the abnormality at timing when the indication of the abnormality is discerned.

Also, the acceleration sensor acquires vibration information during the conveyance, and thereby it is possible to confirm the existence of the step in a connection portion in a case where a plurality of belt conveyor mechanisms are connected to each other. In a case where a new specimen conveyance system is installed, whether the conveyance belts are smoothly connected to each other is checked in the inspection device in the example, and thereby it is possible to detect large steps before the specimen is conveyed. Hence, it is possible to perform smooth installation.

In a case where the inclination sensor is provided as the sensor 102, it is possible to measure an inclined state of the test tube during the conveyance, and particularly, it is possible to evaluate a degree of horizontality of the belt line. Also in this case, the inspection device in the present invention is conveyed before the actual specimen being conveyed, and thereby it is possible to check the degree of horizontality of the belt line in advance. Hence, it is possible to perform smooth installation.

In a case where the microphone is mounted as the sensor 102, it is possible to record operation sound from a drive mechanism during the conveyance on the conveyance line. When the drive mechanism has the occurrence of abnormality, abnormal sound is produced as the operation sound in some cases. Therefore, ambient operation sound is recorded, and a waveform of the recorded sound is compared to that of the operation sound in a preset normal state.

In this manner, it is possible to determine the abnormal state of the drive mechanism. Also, it is possible to detect malfunction of a drive source with a mechanically malfunction sound.

In a case where the illuminance sensor is mounted as the sensor 102, it is possible to record illuminance in the device in the vicinity of the conveyance line. In general, in the specimen conveyance system, the existence of the specimen container is detected by using an optical sensor such as a photo-interrupter (existence sensor) or a fluid volume or a state in the specimen container is detected by using a laser. The illuminance sensor is provided, and thereby it is possible to measure a state of ambient light as a cause of false detection of the photo-interrupter, a fluid volume sensor, or the like. Also, it is possible to check whether the photo-interrupter or a barcode reader for reading a barcode attached to the specimen container outputs a sufficient light intensity, and it is possible to discern between the types of indications before the mechanism is degraded.

In a case where the temperature sensor is mounted as the sensor 102, it is possible to record a temperature in the device in the vicinity of the conveyance line. In a case where the temperature is excessively high or low, there is a possibility that the specimen is degraded when the conveyance is performed for a long time. Hence, the temperature in the device is measured on a regular basis or at timing when the operator needs to perform measurement.

Several types of test tube type inspection devices, on which a detector aiming for the various type of test tube type inspection devices is mounted, are combined and adjustment time is scheduled or replacement of components are performed depending on a change in measurement data by regularly performing the input in daily work. In this manner, it is possible to remarkably reduce a malfunctioning rate in the daily work. Also, a significant effect is achieved in that it is possible to shorten time for maintenance work or to perform evaluation after the adjustment by a serviceperson.

Note that the inspection device according to the example is 16 mm in diameter and is 100 mm in length; however, the shape is not limited thereto. For example, in a case where a test tube (a diameter of 13 mm or the like) having another external shape is used in the specimen conveyance system, the inspection device is more slender. Also, it is not necessary for the shape of the inspection device to be entirely the same as that of the test tube, and the inspection device may have a shape with which the inspection device can be conveyed by a mechanism such as the single-holder rack, the multi-holder rack, or the specimen chuck mechanism that conveys the test tube. For example, in a case where the test tube is conveyed on the rack, there is no particular limitation on the shapes of other regions as long as the inspection device has the external shape that a region that is held by the rack has the same shape as the shape of the test tube or is slightly slender than the test tube. Also, in a case where the test tube is conveyed by the specimen chuck mechanism, a region that is grasped by an arm of the specimen chuck mechanism and the vicinity thereof may have the same shape as that of the common test tube. Also regarding the length of the inspection device, the inspection device may have a length longer than the length of an existing test tube as long as the inspection device may have the length to the extent that the inspection device may not come into contact with a cover or another mechanism of the device to fall down during the conveyance.

Example 2

<Camera on Upper End>

FIG. 4 schematically illustrates a test tube type inspection device 200 (type 2). In FIG. 2, Reference sign 201 represents a housing of the device, and the housing has the substantially same shape with the size of a common test tube (an outer diameter of 16 mm and a length of 100 mm). Reference sign 202 represents a control unit that records imaging data and transmits data. Reference sign 203 represents a power supply unit, and Reference sign 204 represents a camera.

The camera 204 is mounted on the upper end of the inspection device in the embodiment and captures an image in an upward direction of the test tube type inspection device. The captured image is recorded in the control unit, and is transmitted to the external terminal via wired or wireless data communication. The power supply unit uses a rechargeable battery and the wired charge is performed. Note that the wide-angle camera is used as the camera in the example.

In recent years, the mechanism that conveys the specimen is developed to have multiple layers, the specimen is conveyed on the inner side of the device that is covered with a cover, and it is not possible to visually confirm the conveyance state of the specimen from the outside by the operator in some cases. The test tube type inspection device is used, and thereby it is possible to check the state of the conveyance line disposed on the inner side of the device without the removal of the device cover.

Also, it is possible to achieve the image of the test tube from above, and thus it is possible to perform teaching for positional adjustment of the mechanism that accesses the test tube from above. At this time, the captured image is transmitted to an external computer at a real time and it is desirable to display the image on a screen. The operator or the serviceperson can adjust a position of the mechanism while viewing the image displayed on the screen at the real time. For example, it is effective to a mechanism such as the dispersing mechanism or a stirring mechanism that accesses the inside of the container from the opening of the test tube, or a mechanism such as the specimen chuck mechanism in which the upper end of the test tube is pinched and held by an arm.

Note that the wide-angle camera is used in the example; however, it is possible to also check a state of a mechanism positioned not only in the upper side, but also on a side as long as an omnidirectional camera that is capable of performing 360-degree capturing is mounted. For example, the photo interrupter that detects the existence of the test tube during the conveyance, or a barcode reader that reads a barcode label added to the specimen container is disposed on the side in the conveyance direction with respect to the conveyance line in many cases. Therefore, it is possible to check whether the mechanisms are installed at positions at which it is possible to perform correct reading or detection by the omnidirectional camera.

Example 3

<Camera on Lower End>

FIG. 5 schematically illustrates a test tube type inspection device 300 (type 3). In FIG. 3, Reference sign 301 represents a housing of the device, and the housing has the substantially same shape with the size of a common test tube (an outer diameter of 16 mm and a length of 100 mm). Reference sign 302 represents a control unit that records imaging data and transmits data. Reference sign 303 represents a power supply unit, and Reference sign 304 represents a camera.

The camera 304 is mounted on the lower end of the inspection device 300 and captures an image in a downward direction of the test tube type inspection device. The captured image is recorded in the control unit, and is transmitted to the external terminal via wired or wireless data communication. Note that the wide-angle camera is used as an example in the example.

Through registration work of a position at which the test tube is mounted in a common pretreatment device, registration of a position is performed while the mounting position, at which the test tube is set in an operation direction of the device, is visually recognized in a horizontal direction. In a case where teaching work is performed while a video is viewed on an external terminal at the real time by using the camera attached on the lower end of the inspection device, the set position of the test tube is viewed from right above, and thus it is possible to improve the work of teaching and accuracy. Also, a video transmitting process is performed at the real time, and thereby a point of view is obtained from right above the point, at which the registration of the position is performed. Hence, it is also possible to perform automatic teaching.

Example 4

<Case of Using RFID>

FIG. 6 schematically illustrates a conveyance line on which an RFID reader/writer that is capable of transmitting positional information to the test tube type inspection device in the present invention is disposed.

In the test tube conveyance system in the example, management of a conveyance situation of the specimen container or a reagent container is performed by using a readable/writable RFID tag 401. An RFID reader/writer 402 that performs reading and writing on the RFID tag is disposed in the vicinity of a conveyance line 406 of the specimen conveyance system. A place, in which the RFID reader/writer is disposed, is the vicinity of a position at which the mechanism such as the dispensing mechanism or the specimen chuck mechanism accesses the test tube or the vicinity of a diverging portion.

According to the example, the inspection device is mounted on a rack 407 and is conveyed over the belt conveyor 406. The RFID reader/writer 402 that transmits the positional information to the RFID tag provided in the inspection device is provided below the belt conveyor 406. The positional information written in the RFID tag is transmitted to a control unit 403 and is stored in association with various types of information acquired by a sensor 404 or a camera 405. The detected data is transmitted to an external computer in a wired or wireless manner. An operator associates sensing information with the positional information and checks the information, and thereby it is possible to immediately identify a position in the device, at which abnormality is assumed to occur, and to correspond to the information.

Note that the RFID tag is used as an example in the example; however, a configuration other than the RFID tag may be employed as long as a storage medium that is capable of writing the positional information in a non-contact manner is used.

Example 5

<Accommodated Type of Inspection Device in Test Tube>

FIG. 7 schematically illustrates an inspection device 500 (type 4) according to the present invention. The inspection device includes a sensor 502 that detects acceleration, an angle, a temperature, illuminance, sound, or the like, a control unit 503 that stores and determines measurement data, and a power supply unit 504.

The external shape of the inspection device according to the example is configured to have a smaller diameter than an inner diameter of a test tube 506 that is used in the common specimen conveyance system, and the inspection device 500 is accommodated inside the hollow test tube 506. Similar to another test tube, the inspection device is conveyed in the specimen conveyance system, and thereby it is possible to perform the inspection.

The operator or the service person sets the test tube that accommodates the inspection device 500 in a specimen input portion, and starts the conveyance in an operation state of the device. When common conveyance is ended and the inspection device 500 is accommodated in a specimen accommodating portion, the inspection device 500 is taken out from the test tube, is connected to an external computer, and collects recorded information, and it is possible to check a state of the device/mechanism of the specimen conveyance system.

According to the example, it is possible to monitor an installation state of the device using the inspection device 500, a degradation situation of the mechanism, and an ambient environment, regardless of types of test tubes which are used. Hence, it is possible to easily expand a region to which the inspection device 500 is applicable.

Example 6

<Inspection Device for Measuring Shakiness of Test Tube>

In the example, the test tube type inspection device is adjusted to have substantially the same weight and center of gravity as those of the specimen container, into which the specimen is input.

FIG. 8 schematically illustrates a test tube type inspection device 600 (type 5) according to the present invention. In the example, a specimen container 601 such as a vacuum blood collecting tube, to which a cover 609 is attached, is defined as an outline of the inspection device, a sensor 602 of acceleration or an angular velocity, a control unit 603 that records and determines measurement data, a power supply unit 605, a weight 607, and a spacer 608 are provided in the specimen container 601. The power supply unit 605 supplies power to the sensor 602, the control unit 605, or the like. The control unit 605 may include a storage unit that stores output data from the sensor and a transmission unit that transmits stored data to the outside, and, in this case, power is supplied to the storage unit and the transmission unit.

In the example, the weight and the length of the weight 607 and the spacer 608 are adjusted such that the weight and the center of gravity of the inspection device are the same as those of the specimen container into which the specimen is input. In other words, a plurality of types of weights and spacers are prepared and are interchanged, and thereby the inspection device is adjusted to have the same weight and center of gravity as those of the specimen container into which the specimen is input. Hence, the inspection device is provided with an opening through which it is possible to input and to output the weight or the spacer. Since a specified amount of specimen having small variations in density such as blood depending on the size and a degree of vacuum of the container is suctioned to the specimen container 601 such as the vacuum blood collecting tube, the weight and the center of gravity are maintained to be constant after the suction of the specimen. The sensor 602, the control unit 603, the power supply unit 605, the weight 607, and the spacer 608 are disposed in the hollow specimen container 601 such that the weight and the center of gravity of the specimen container 601 is maintained to be constant after the suction of the specimen. Since it is not possible to arbitrarily change the weight and the center of gravity of the sensor 602, the control unit 603, and the power supply unit 605, the weight and the length of the weight or the spacer are adjusted. The length or the size of the weight is adjusted, and thereby it is possible to adjust the weight of the inspection device. In addition, the length or the size of the spacer is adjusted, and thereby it is possible to adjust the position of the center of gravity of the inspection device. Only one of the weight or the center of gravity may be adjusted; however, it is preferable that both of the weight and the center of gravity are adjusted in order for the inspection device to move in the same manner as that of the specimen container into which the specimen is input during the conveyance.

According to the example, since it is possible to obtain measurement data closer to the motion of the specimen container in the conveyance line, it is easy to set a target value of step adjustment or the like. Note that, in the example, an example in which both of the weight and the center of gravity are adjusted is described; however, it is clear to adjust only one piece side.

Example 7

<Rack Type Inspection Device>

In the example, the rack type inspection device including a sensor installed on a rack is described. Hereinafter, the single-holder rack is described as an example; however, application of the embodiment is not limited thereto, and it is possible to apply to a rack into which a plurality of specimen containers are accommodated. The "rack" is provided with an accommodation portion that is capable of holding the test tube, and is referred to as a "conveyance body" in some cases because the rack is conveyed over the conveyance belt.

FIG. 9 illustrates a structure of a rack type inspection device 700 (type 6) including a sensor installed on the single-holder rack. The rack type inspection device includes, inside the single-holder rack, a power receiving unit 701, in addition to a sensor unit 702, a power supply unit 705, and a control unit 703. Similar to the example described above, the sensor unit 702 detects a state in the device during the conveyance. Also, as described above, the control unit 703 may include a storage unit that stores output data from the sensor and a transmission unit that transmits stored data to the outside. The power receiving unit 701 receives power trough electromagnetic induction from a power transmitting unit 704 in an external portion provided with the conveyance line 406 interposed therebetween, and supplies the power to the power supply unit 705. The power supply unit 705 supplies the power to the sensor and the storage unit or the transmission unit in the control unit. The power transmitting unit 704 is provided outside the inspection device 700. More preferably, the power transmitting unit 704 is provided in at least apart of the conveyance path. As illustrated in FIG. 9, the power transmitting unit 704 may be opposite to the rack type inspection device 700 with the conveyance line interposed therebetween, or may be buried in the conveyance line so as to be directly opposite to the bottom of the rack type inspection device 700.

Also, the power receiving unit 701 and the power transmitting unit 704 may have respective communication functions. In this case, 701 and 704 can be called the communication units respectively. The communication unit 704 provided on the conveyance line transmits a command of measurement starting time or a time width from a system control unit 707, which controls the entire specimen conveyance system, to the control unit 703 in the rack through the communication unit 701 in the single-holder rack. Also, the communication unit 704 receives information of motion of the rack obtained from the sensor unit 702, which is stored in the control unit 703, and transmits the information to the system control unit 707. The rack type inspection device 700 has a test tube holder 711, which is the same as the single-holder rack that fixes the test tube on the rack with the periphery of the lower portion of test tube interposed thereby; however, the test tube holder 711 may not be provided or another sensor may be installed on an outer upper portion of the rack. Also, the communication unit 701 may directly communicate with the system control unit in a wireless manner without the communication unit 704. Note that the communication unit may be separately provided from the power receiving unit or the power transmitting unit.

Usually, a line, over which only an empty rack without the test tube mounted is conveyed, is provided in the conveyance line; however, it is possible to obtain information of the conveyance line including not only the line through which the test tube passes but also the line through which only the empty rack passes. Also, since it is possible to charge the power supply unit and to receive and transmit information to and from the system control unit on the conveyance line, the inspection device is conveyed in the specimen conveyance system along with the specimen container, in which another specimen is contained, and thereby it is possible to always monitor the state of the specimen conveyance system.

Note that, the power receiving unit 701 and the power transmitting unit 704 described in the example can also be applied to a test tube type inspection device described in another example.

Example 8

<Inspection Device Corresponding to Automatic Charge/Display/Remote Control>

In the example, a display method for the measurement results is described.

FIG. 10 schematically illustrates a test tube type inspection device 800 (type 7). The inspection device 800 includes a sensor 802, a control unit 803, a display unit 804, a power supply unit 805, a communicating coil 807, a power receiving coil 808, and a power supply/communication converter 806. Also, a power transmission/communication dock 820 includes a test tube holder 826, a communicating coil 827, a power transmitting coil 828, and a power supply/communication converter 829. Also, a remote control 810 includes a display unit 811, a control unit 813, an operation button 812, and a power supply 815. When the inspection device 800 is installed in the test tube holder 826 of the power transmission/communication dock 820, the communicating coil 807 of the inspection device 800 approaches the communicating coil 827 of the power transmission/communication dock 820, and it is possible to perform data communication between the inspection device 800 and the system control unit 707. Also, the power receiving coil 808 of the inspection device 800 approaches the power transmitting coil 828 of the power transmission/communication dock 820, and it is possible to perform non-contact charge of the power supply unit 805. The power supply/communication converter 806 and the power supply/communication converter 829 control data communication between the communicating coil 807 and the communicating coil 827, and it is possible to transmit and receive data between the control unit 803 of the inspection device 800 and the system control unit 707 that controls the entire specimen conveyance system. Also, the power supply/communication converter 829 causes current to flow to the power transmitting coil 828, and thereby the current generated in the power receiving coil 808 is converted into an appropriate level in the power supply/communication converter 806 such that the power supply 805 is charged.

A signal obtained by the sensor 802 of the inspection device 800 is converted into a measurement value of a step in the calculation unit included in the control unit 803 and the converted value is displayed on the display unit 804. As described above, the measurement results are displayed on the inspection device, and thereby it is possible to recognize a position and a state of a step in the place of an operator. Hence, the efficiency during the work of modifying the step is improved.

Also, the remote control 810 performs wireless communication with the control unit 803 of the inspection device 800, and the control unit 813 receives the measurement results transmitted from the control unit 803 and the results are displayed on the display unit 811. Also, the operation button 812 outputs a command such as switching between displays of the display unit 811 and the display unit 804 or a measurement start to the inspection device 800. In general, the specimen conveyance system is large in some cases, and it is not possible to visually recognize the display unit 804 of the inspection device 800. Hence, it is desirable that a step detected can be grasped at hand with the remote control. Also, in a case where a plurality of inspection devices run on the conveyance line, display of the measurement results of the inspection device is switched by hand with the remote control, and thereby it is not necessary for the operator to follow the inspection device on the conveyance line.

Since the inspection device 800 is installed on the power transmission/communication dock 820 by the specimen chuck mechanism 10, it is desirable that the inspection device is disposed in a part of the input module 1, the centrifugal module 2, and the accommodation module 7; however, a specimen chuck mechanism and the power transmission/communication dock are provided in another module.

According to the example, since the inspection device continuously exists in the specimen conveyance system and it is possible to perform automatic charge or direct operation by the system control unit, it is possible to perform automatic continuous monitoring of the specimen conveyance system and it is easy to perform the device maintenance. Also, since it is possible to visually recognize the measurement results or operate the inspection device by the remote control at the place, it is easy for the operator to perform the device adjustment or maintenance.

Example 9

<Step Measurement Method>

In the example, in FIGS. 11 to 18, a method for obtaining a value of a step of a joint (connection portion) of the belt line in response to an angular velocity signal obtained from the inspection device.

The belt line has a case where forward directions of the belt on the upstream side and the belt on the downstream side are orthogonal to each other and a case where the forward directions are straight in the same direction. FIG. 11 illustrates the motion of the single-holder rack in a case where the forward directions between the belt lines are orthogonal, and FIG. 12 illustrates the one in a case where the belts move straight. FIGS. 11(a) to 11(c) and 12(a) to 12(c) illustrate motion when viewed from a side surface, and FIGS. 11(d) to 11(f) and 12(d) to 12(f) illustrate motion when viewed from an upper surface. Usually, a belt surface is set to be lower on the downstream side than on the upstream side such that the single-holder rack is not stopped or does not fall over by coming into contact with a side surface of the belt on the downstream side. In a case where the forward directions are orthogonal to each other between the belts, and the single-holder rack 11 placed on a belt 4061 on the upstream side reaches a step 4361 of the connection portion (FIGS. 11(a) and 11(d)), the front end in the forward direction inclines to a belt 4062 side on the downstream side and comes into contact with the belt 4062 (FIGS. 11(b) and 11(e)). Further, the rack is pushed by the belt 4061, is dragged by the belt 4062, lands on the belt 4062 while rotating around a center axis 111 perpendicular to the bottom (FIGS. 11(c) and 11(f)), and moves toward the next belt line.

Also, in a case where the rack moves straight between the belts as illustrated in FIG. 12, and the single-holder rack 11 placed on a belt 4063 on the upstream side reaches a step 4363 of the connection portion (FIGS. 12(a) and 12(d)), the front end in the forward direction inclines to a belt 4064 side on the downstream side and comes into contact with the belt 4064 (FIGS. 12(b) and 12(e)). Further, the rack is pushed by the belt 4063 and is dragged by the belt 4064; however, the forward directions are the same. Therefore, the rack moves without rotating around the center axis 111 and lands on the belt 4064 (FIGS. 12(c) and 12(f)), and moves toward the next belt line. Here, since a guide having a flat plate shape is provided on both sides of the belt such that the single-holder rack does not depart from the belt, the side surface of the single-holder rack comes into contact with the guide and rotates in some cases.

FIG. 13 illustrates an aspect in which the single-holder rack 11 sequentially moves between the plurality of belt lines. It is supposed that a y-axis of a three-dimensional coordinate 1110 of the sensor on the single-holder rack 11 placed on the belt 4061 is the forward direction of the belt, an x-axis is a direction that is parallel to the belt surface and perpendicular to the forward direction, and a z-axis is coincidental to the center axis 111 of the single-holder rack 11 (in FIG. 13, an arrow fixed to the single-holder rack 11 represents the y-axis). In a case where the forward directions between the belt lines are orthogonal to each other (For example, from the belt 4061 to the belt 4062), the x-axis and the y-axis of the sensor largely rotate around the center axis 111. On the other hand, in a case where the rack moves straight between the belt lines, little rotation occurs. In the belt line in FIG. 13, the RFIDs are disposed so as to interpose only one joint (connection portion) of the belts between the two RFIDs. As described below, the RFIDs can be used to identify timing 9652 (time point $t_2$) when the front end of the single-holder rack reaches the belt 4063 on the upstream side; however, the RFIDs may not be provided unless necessary.

FIG. 14 illustrates an example of a time change of outputs of angular velocity around the x-axis, the y-axis, and the z-axis obtained from the sensor that passes through the belt line in FIG. 13. The timing of passing the RFIDs in FIG. 13 is together illustrated. The timings when the front end of the single holder 11 reaches the belt on the downstream side are represented by dashed lines 941, 942, 943, and 944 in this order. Angular velocity 930 around the z-axis starts to change from the timing when the single holder 11 comes into contact with the belt on the downstream side, and the angular velocity returns to 0 when the single holder 11 lands on the belt on the downstream side. In a case where the forward directions are orthogonal to each other, rotation around the z-axis is increased. Therefore, it is easy to detect the contact timing from the angular velocity 930 around the z-axis; however, in a case where the rack moves straight, a small change occurs, and thus it is difficult to perform detection. Also, in a case where the single holder moves straight on the line, little rotation occurs due to the contact with the guide, and thus the degree is equal to or lower than the sensitivity of the angular velocity sensor in some cases. Therefore, an error between a rotating angle around the z-axis obtained by integrating angular velocities during the movement between the belt lines and an actual rotating angle illustrated in FIG. 13 is increased in some cases. Usually, since the motion of the single holder is considered as the movement on the device, the output from the sensor is subjected to coordinate conversion by using the rotating angle around the z-axis and is converted into a value on a three-dimensional coordinate system 1120 fixed to the device. For example, when the angular velocities and the angles around the x-axis, the y-axis, and the z-axis are $d\theta/dt$, $d\phi/dt$, $d\psi/dt$, $\theta$, $\phi$, $\psi$, respectively, and the angular velocities and the angles around an X-axis, a Y-axis, and a Z-axis are $d\Theta/dt$, $d\Phi/dt$, $d\Psi/dt$, $\Theta$, $\Phi$, and $\Psi$, respectively, it is possible to obtain the angular velocities and the angles as follows.

$$d\Theta/dt = \sin\phi \, d\theta/dt + \cos\phi \, \cos\phi \, d\phi/dt \quad \text{Expression (1)}$$

$$d\Phi/dt = \cos\phi \, d\theta/dt - \sin\phi \, \cos\phi \, d\phi/dt \quad \text{Expression (2)}$$

$$d\Psi/dt = \sin\phi \, d\phi/dt + d\phi/dt \quad \text{Expression (3)}$$

From Expressions (1) and (2), when an error occurs in the rotating angle $\psi$ around the z-axis, $\Theta$ and $\Phi$ representing the inclination at the step are found not to be obtained with accuracy. As illustrated in FIGS. 11 and 12, by using a state in which the inclination at the step occurs toward the forward direction, absolute values $d\alpha/dt$ obtained by combining the angular velocities around the x-axis and the y-axis are integrated and inclination $\alpha$ at the step is obtained. Here, $d\alpha/dt$ is obtained in the following expression.

$$d\alpha/dt = \{(d\theta/dt)2 + (d\phi/dt)2 | 0.5 \quad \text{Expression (4)}$$

Figure 15A:
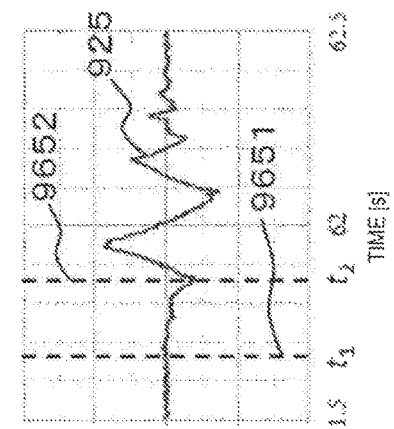
FIGS. 15A through 15C are diagrams illustrating an actual example of a change in angular velocity in a connection portion between belts.
Figure 15B:
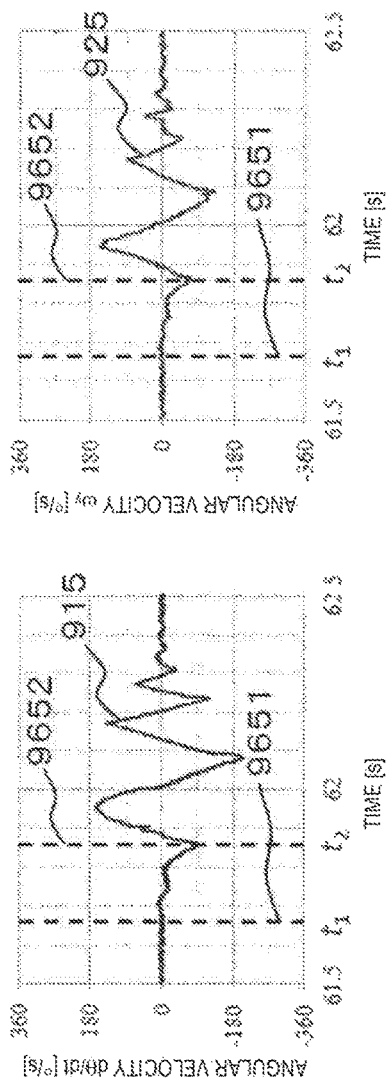
Figure 15C:
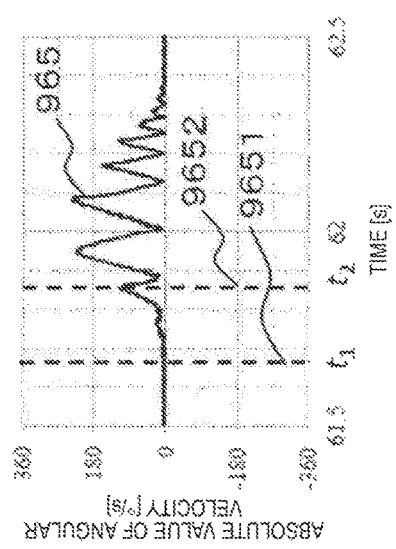

The vertical axes in FIGS. 15(a) and 15(b) represent respective examples of the angular velocities around the x-axis and the y-axis which are measured when the single holder 11 moves straight between the belts. The vertical axis in FIG. 15(c) represents absolute values obtained by Expression (4). In a case where the single holder 11 moves between a plurality of belts, a plurality of changes in angular velocity exist in the obtained data of the angular velocity as illustrated in FIG. 15. The timing at which the single rack 11 comes into contact with the belt on the downstream side can be obtained from a rise in angular velocity around the z-axis in FIG. 14. Also, when the RFID is provided for each line as illustrated in FIG. 13, only one connection portion between the belts exists between two adjacent RFIDs. Therefore, a change 915, 925, or 965 in angular velocity due to passing through a connection portion illustrated in FIG. 15 between two RFID signals occurs at only one position. Hence, it is possible to detect the first peak in the change and the peak timing can be the timing 9652 (time point $t_2$) when the front end of the single-holder rack reaches the belt 4063 on the upstream side.

Also, a timing 9651 (time point $t_1$) when the front end of the single-holder rack reaches the belt 4063 on the upstream side is obtained as follows when L represents a diameter of the single-holder rack, and V represents a speed of the belt on the upstream side.

$t1=t2-L/V$   Expression (5)

Also, as expressed in Expression (6), it is possible to obtain an inclined angle $\alpha$ at the step by integrating the absolute values of the angular velocities between the timing 9651 (time point $t_1$) when the front end of the single-holder rack reaches the belt 4063 on the upstream side and the timing 9652 (time point $t_2$) when the front end comes into contact with the belt on the downstream side.

$\alpha=\int_{t_1}^{t_2}\{(d\theta/dt)^2+(d\varphi/dt)^2\}^{0.5}dt$   Expression (6)

Next, a method for obtaining the step from the inclined angle $\alpha$ is described. FIG. 16 is a schematic diagram obtained at the moment that the front end of the single holder 11 comes into contact with the belt 4062 on the downstream side. When r represents a radius of a pulley 4161 that comes into contact with a terminal of the belt 4061 on the upstream side, h represents a step, and L1 represents a distance between a contact line of the bottom of the single holder 11 with a circumferential surface of the roller 4161 and a point at which the front end of the single holder 11 comes into contact with the belt 4062 on the downstream side, it is possible to satisfy the following relationship based on a geometric relationship.

$r-h=(r-L1 \tan \alpha)\cos \alpha$   Expression (7)

Also, since the timing when the inclination starts is considered to be at least after the front end of the single holder 11 is separated from the roller 4161, the step h is as follows from the two expressions described above.

$L1=bL, 0<b<I$   Expression (8)

$h=(1-\cos \alpha)r+bL \sin \alpha$   Expression (9)

b changes depending on a position of the center of gravity of the single holder 11 (including the test tube 17) or the speed of the belt 4061 on the upstream side, and thus b is not constant; however, the inclined angle $\alpha$ with respect to the known step set as illustrated in FIG. 17 is obtained through experiments, and it is possible to calculate the inclined angle in Expression (9). When b=0.6 in the example, experimental data matches with a curved line (dashed line) expressed in Expression (9). Also, a condition of Expression (8) is also satisfied.

FIG. 18 shows results of the steps in 14 belt connection portions which are calculated from data of the angular velocity through a method of the example when the rack passes through a plurality of belt line mechanisms. In FIG. 18, a first measurement result 961 is represented by a solid line, and a second measurement result 962 is represented by a dotted line. Since the first measurement result 961 and the second measurement result 962 are remarkably coincident with each other, the effectiveness of a step measuring method of the example is known.

Since it is possible to automatically and quantitatively calculate the step between the belts from the angular velocity obtained by the angular velocity sensor according to the example, it is possible to reduce effort for the adjustment or maintenance of the device.

Example 10

<Distance Sensor on Bottom>

In the example, an example in which the distance sensor is provided on the bottom of the rack type inspection device is described. Hereinafter, the "bottom" means a surface that faces the conveyance belt.

FIG. 19 illustrates a state in which a distance sensor 727 is provided on the bottom of a rack type inspection device 720 of the example 7 illustrated in FIG. 9. The distance sensor 727 is installed to face the conveyance belt. The distance sensor 727 reacts to a belt, a metal plate (not illustrated) that supports the belt on the back surface, or the like and measures a distance between the distance sensor 727 and the belt or the metal surface. In other words, the distance sensor 727 measures a distance from the bottom of the conveyance body on which the distance sensor is provided to the conveyance belt. When a distance measured target is metal, it is possible to use an eddy-current sensor. Also, when the distance measured target is a belt, it is possible to use a reflective optical sensor or an ultrasonic sensor. For example, in FIG. 19, the rack type inspection device 720 moves between the belts. In such a case, the distance that is measured by the distance sensor 727 is significantly changed. Also, in a case where the rack type inspection device 720 is placed on the belt, the output of the distance sensor 727 changes to the smallest extent, and thus it is possible to detect a position of the connection portion between the belts by the change in an output value of the distance sensor 727. Also, a calibration curve for calculating the step may be created so as to obtain the step by using the output from the distance sensor 727 when passing through the known step. Also, a step measurement dedicated inspection device having the distance sensor 727, a calculation circuit that calculates the step from the output of the distance sensor 727, a memory that records the calculation results, a display device such as an LCD that displays the calculation results, a battery that is a power supply for the members, an operation button that performs switching between the calculation results and ON and OFF of the power supply, and a connection terminal that receives power supply and reception and transmission of information from the outside may be provided. Also, it is preferable that the distance sensor 727 is provided at the center of the bottom of the rack type inspection device 720.

According to the example, since it is possible to detect the position of the connection portion between the belts in response to a signal from the distance sensor 727, the RFIDs illustrated in FIG. 9 are not necessary, and thus it is possible to reduce costs of the device. Also, since the step is obtained from the output from the distance sensor, there is no need to mount another sensor for detecting the step or the connection portion. In this manner, it is possible to realize the inspection device at low costs. Also, when the distance sensor 727 is provided at the center of the bottom of the rack type inspection device 720, the rack is not shifted from the vicinity of the center of the belt even when the rack rotates around the z-axis, and thus the measurement accuracy is improved because the output from the sensor is not changed due to the rotation around the z-axis.

Note that the present invention is not limited to the examples described above, and includes various modification examples. For example, the examples are described in detail for easy understanding of the present invention, and the present invention is not necessarily limited to including the entire configuration described above. Also, it is possible to replace a part of a configuration of an example with a configuration of another example, and it is possible to add a configuration of an example to a configuration of another example. Also, it is possible to add another configuration to, to remove, or to replace, with another configuration, a part of each of the configurations of the examples. Also, a part or the entirety of the configurations, the functions, the processing units, processing means, or the like may be realized by hardware by designing an integrated circuit, for example. Also, the configurations, the functions, and the like described above may be realized with software by analyzing and performing programs by which processors realize respective functions.

It is possible to place information of the programs, tables, files, or the like that realize the functions in a recording device such as a memory, a hard disk, or a solid state drive (SSD) or a recording medium such as an IC card, an SD card, or an optical disk.

Also, control wires or information wires are illustrated when the wires are considered to be necessary for description, and all of the control wires or the information wires are not necessarily illustrated for a product. Actually, almost all of the configurations may be considered to be connected to each other.

REFERENCE SIGNS LIST

1: input module
2: centrifugal module
3: opening module
4: child specimen preparing module
5: dispensing module
6: closing module
7: accommodation module
9: belt conveyor
11: single-holder rack
12: multi-holder rack
13: specimen chuck mechanism
14: dispensing probe mechanism
17: test tube
100, 200, 300, 500, 600, 700, 800: inspection device
101, 201, 301, 501: housing
102, 404: sensor
103, 202, 302, 403: control unit
104: stopper mechanism
105, 203, 303, 504: power supply unit
106: warning light
111: center axis
204, 304, 405: camera
600: inspection device
601: specimen container
602: sensor
603: control unit
605: power supply unit
607: weight
608: spacer
609: cover
700: rack type inspection device
701: power receiving/communicating unit
702: sensing unit
703: control unit
704: power transmitting/communicating unit
705: power supply unit
707: system control unit
711: test tube holder
727: distance sensor
800: inspection device
802: sensor
803: control unit
804: display unit
805: power supply unit
806: power supply/communication converter
807: communicating coil
808: power receiving coil
810: remote control
811: display unit
812: operation button
813: control unit
820: power transmission/communication dock
826: rack
827: communicating coil
828: power transmitting coil
829: power supply/communication converter
910: angular velocity around x-axis (sensor coordinate system)
915: angular velocity change around x-axis (sensor output)
920: angular velocity around y-axis (sensor coordinate system)
925: angular velocity change around y-axis (sensor output)
930: angular velocity around z-axis (sensor coordinate system)
961: first measurement value
962: second measurement value
965: change in absolute value of angular velocity
1110: coordinate system of sensor on rack
1111, 1112, 1113, 1114, 1115: rack
1120: coordinate system of device (outside)
4021, 4022, 4023, 4024, 4025: RFID reader/writer
4061, 4062, 4063, 4064, 4065: belt
4161, 4163, 4164: pulley
4261, 4262, 4263, 4264: guide
4361, 4363: step

The invention claimed is:

1. An inspection device comprising:
a housing having an external shape that can be detachably held by a conveyance body that is capable of holding a test tube and conveying the test tube over a conveyance belt;
a sensor that is provided in the housing and detects a state in a device during the conveyance;
a storage unit that stores output data from the sensor;
a transmission unit that transmits data in the storage unit to an outside;
a power supply unit that supplies power to the sensor, the storage unit, and the transmission unit; and
a power receiving unit that receives power from a power transmitting unit installed outside the inspection device and supplies power to the power supply unit.

2. The inspection device according to claim 1, wherein the sensor is at least one of an acceleration sensor, an angular velocity sensor, an inclination sensor, a microphone, an illuminance sensor, and a temperature sensor.

3. The inspection device according to claim 1,
wherein the sensor is an imaging element, and
wherein the transmission unit is means for transmitting, to an external computer, an image captured by the imaging element.

4. The inspection device according to claim 1, further comprising:
a storage medium that is capable of writing, in a non-contact manner, positional information from a writing antenna disposed in the vicinity of a conveyance route during the conveyance by the conveyance body.

5. The inspection device according to claim 1,
wherein, in a state in which the sensor, the storage unit, and the transmission unit are accommodated in the test tube, the test tube is held in the rack and conveyed in the automatic analysis device, and thereby a state in the device during the conveyance is detected by the sensor and is stored in the storage unit.

6. The inspection device according to claim 1, further comprising:
a weight that adjusts a weight of the inspection device or a spacer that adjusts the center of gravity of the inspection device.

7. The inspection device according to claim 1,
wherein the power receiving unit receives power from the power transmitting unit that is provided in a part of a conveyance path.

8. The inspection device according to claim 1, further comprising:
a calculation unit that processes output data from the sensor; and
a display unit that displays a calculation result in the calculation unit.

9. An inspection device comprising:
a conveyance body that is capable of holding a test tube and conveying the test tube over a conveyance belt;
a sensor that is provided in the conveyance body and detects a state in a device during the conveyance;
a storage unit that stores output data from the sensor; and
a transmission unit that transmits data in the storage unit to an outside;
a power supply unit that supplies power to the sensor, the storage unit, and the transmission unit; and
a power receiving unit that receives power from a power transmitting unit installed outside the inspection device and supplies power to the power supply unit.

10. The inspection device according to claim 9,
wherein the power receiving unit receives power from the power transmitting unit that is provided in a part of a conveyance path.

11. The inspection device according to claim 9, further comprising:
a distance sensor that is provided on a bottom of the conveyance body and measures a distance from the bottom of the conveyance body to the conveyance belt.

* * * * *